United States Patent
Xu

(10) Patent No.: US 11,399,537 B2
(45) Date of Patent: Aug. 2, 2022

(54) CELL FREEZE-DRYING SYSTEM AND METHOD

(71) Applicant: Xiaoyang Xu, Guangdong (CN)

(72) Inventor: Xiaoyang Xu, Guangdong (CN)

( * ) Notice: Subject to any disclaimer, the term of this patent is extended or adjusted under 35 U.S.C. 154(b) by 490 days.

(21) Appl. No.: 16/487,154

(22) PCT Filed: Feb. 24, 2017

(86) PCT No.: PCT/CN2017/074762
§ 371 (c)(1),
(2) Date: Sep. 17, 2019

(87) PCT Pub. No.: WO2018/148982
PCT Pub. Date: Aug. 23, 2018

(65) Prior Publication Data
US 2020/0054003 A1    Feb. 20, 2020

(30) Foreign Application Priority Data
Feb. 20, 2017 (CN) .......................... 201710090552.X

(51) Int. Cl.
*A01N 1/02* (2006.01)
(52) U.S. Cl.
CPC .......... *A01N 1/0284* (2013.01); *A01N 1/0257* (2013.01)
(58) Field of Classification Search
CPC ................................ F26B 5/06; A01N 1/0257
(Continued)

(56) References Cited

U.S. PATENT DOCUMENTS 2,411,152 A * 11/1946 Folsom ..................... F26B 5/06
264/5
3,313,032 A * 4/1967 Malecki .................. F26B 5/065
62/57
(Continued)

FOREIGN PATENT DOCUMENTS

EP    2601466 B1 * 10/2017 .............. F26B 5/065
EP    3583847 A4 * 3/2020 ........... A01N 1/0257
(Continued)

OTHER PUBLICATIONS

International Search Report of PCT Patent Application No. PCT/CN2017/074762 dated Nov. 8, 2017.
(Continued)

*Primary Examiner* — Stephen M Gravini

(57) ABSTRACT

A cell freeze-drying system, comprising: a temperature-elevated nitrogen supplier, a freeze-drying operation box, and a gas discharger, which are connected in that order using a first connection pipe. The temperature-elevated nitrogen supplier supplies warmed nitrogen to the freeze-drying operation box. A cell sample frozen by liquid nitrogen is placed in the freeze-drying operation box, and then the freeze-drying operation box, which is preset to a temperature suitable for placing the cell sample frozen by liquid nitrogen, is warmed up in a preset mode while continuously being supplied with the warmed nitrogen to sublimate solid state water in the cell sample into gaseous water. The gas discharger is used to discharge the gaseous nitrogen and the gaseous water. Further disclosed is a cell freeze-drying method. The invention can effectively address an issue of cell damage and contamination during freeze-drying, and realizes safety, efficiency, and low costs for cell freeze-drying.

10 Claims, 3 Drawing Sheets

(58) Field of Classification Search
USPC .................................................. 34/92, 298
See application file for complete search history.

(56) References Cited

U.S. PATENT DOCUMENTS

| | | | | |
|---|---|---|---|---|
| 5,727,333 | A * | 3/1998 | Folan | F26B 5/065 |
| | | | | 34/92 |
| 9,052,138 | B2 * | 6/2015 | DeMarco | F26B 5/065 |
| 9,469,835 | B2 * | 10/2016 | Bronshtein | C12N 1/04 |
| 9,476,642 | B2 * | 10/2016 | Kim | F26B 5/04 |
| 9,739,532 | B2 * | 8/2017 | Baugh | F26B 9/06 |
| 9,863,701 | B2 * | 1/2018 | Robinson | F26B 5/065 |
| 10,782,070 | B2 * | 9/2020 | Dern | F25B 13/00 |
| 10,864,457 | B2 * | 12/2020 | Madsen | C12N 1/20 |
| 10,907,897 | B2 * | 2/2021 | Swatkoski | F26B 5/044 |
| 2007/0190158 | A1 * | 8/2007 | Hwang | A61K 9/0043 |
| | | | | 424/489 |
| 2020/0054003 | A1 * | 2/2020 | Xu | A01N 1/0268 |
| 2021/0163525 | A1 * | 6/2021 | Zou | G01N 30/7233 |

FOREIGN PATENT DOCUMENTS

| | | | | |
|---|---|---|---|---|
| JP | 6883672 B2 * | 6/2021 | ........... | A01N 1/0257 |
| WO | WO-2012018320 A1 * | 2/2012 | ............. | F26B 5/065 |
| WO | WO-2013061104 A3 * | 10/2013 | ............. | A61K 47/02 |
| WO | WO-2018148982 A1 * | 8/2018 | ........... | A01N 1/0257 |

OTHER PUBLICATIONS

Yang, Jianping et al., Chapter 5 Veterinary Biological Products Production Equipment and Sewage Treatment Section 5 Lyophilization Equipment and Lyophilization Technology, Veterinary Biotechnology, Sep. 30, 2009, pp. 69-72.

* cited by examiner

CELL FREEZE-DRYING SYSTEM AND METHOD

FIELD OF THE INVENTION

The present invention relates to the technical field of cell preservation technology, in particular to a cell freeze-drying system and method.

BACKGROUND OF THE INVENTION

A commonly used cell dehydration method is a vacuum freeze-drying method, which relies on a vacuum freeze-drying device to realize control of a gaseous water pressure in a confined space and input of sublimation energy, thereby completing cell freeze-drying. The freeze-dried cells obtained by this method have obvious defects of microstructural damage and a low recovery rate. Specific reasons of damage caused by freeze-drying are not clear, and a main influencing factor may be the internal stress of cells during the freeze-drying. Under the current industrial equipment conditions, it is difficult to obtain a controllable temperature environment lower than −90° C. at a low cost. Further, the initial operating temperature of the artificial environment for cell freeze-drying is generally not lower than −90° C., while liquid nitrogen is commonly used as a working medium for freezing cells, and there is a huge temperature difference between the initial operating temperature and the liquid nitrogen temperature, which may be an important reason of cell damage caused by freeze-drying.

At present, freeze-drying equipment commonly used in cell laboratories still has serious pollution problems. Since it is needed for such equipment to continuously operate the vacuum pump for more than 24 hours so as to control the gaseous water partial pressure in the operating space and maintain a negative pressure state, it is inevitable to consume and vapour lubricating oil, and it is difficult to control severe vibration and noise. Therefore, such equipment is poorly matched with the cell laboratories, it is not possible to operate indoors, and it is difficult to connect with a cell freeze-thaw equipment.

Cell is a basic functional unit of complex organism, and the definition of human health and disease ultimately points to cells. Human medicine began with organs, systems, and tissues as objects of investigation and intervention, and now rapidly turns to cell methods, including gene editing, high-throughput DNA sequencing, artificially modified immune cells, and so on. These methods can be referred to as clinical cell methods, and higher efficiency and lower cost clinical medical method systems are rapidly being established. In the era of cell medicine, safe and low-cost cell preservation has great social and economic significance. Development of safe, efficient, and low-cost cell freeze-drying methods and equipment is one of the foundations of the cell medicine and cell industries.

SUMMARY OF THE INVENTION

In one aspect, it is an objective of an embodiment of the present invention to provide a cell freeze-drying system and method, which can effectively solve the problems of cell damage caused by freeze-drying and pollution, while effects of safety, high efficiency and low cost are achieved.

In order to achieve the above objective, an embodiment of the present invention provide a cell freeze-drying system, comprising: a temperature-elevated nitrogen supplier, a freeze-drying operation box, and a gas discharger; the temperature-elevated nitrogen supplier, the freeze-drying operation box, and the gas discharger are connected in that order by using a first connecting pipe, wherein the temperature-elevated nitrogen supplier supplies warmed gaseous nitrogen to the freeze-drying operation box; the freeze-drying operation box is warmed up in a preset mode while continuously being supplied with the warmed gaseous nitrogen after a cell sample is placed in the freeze-drying operation box in order to freeze-dry the cell sample, such that solid state water in the cell sample is sublimated into gaseous water; wherein the cell sample is a cell sample frozen by liquid nitrogen; the freeze-drying operation box has been preset to a temperature suitable for placing the cell sample frozen by liquid nitrogen; and the gas discharger discharges gaseous nitrogen and the gaseous water obtained from sublimation of the solid state water in the cell sample.

Compared with the prior art, in the technical solution disclosed in the present invention, the cell freeze-drying system is provided with the temperature-elevated nitrogen supplier, the freeze-drying operation box and the gas discharger; the temperature-elevated nitrogen supplier supplies warmed gaseous nitrogen to the freeze-drying operation box; the freeze-drying operation box, which has been pre-cooled prior to placing the cell sample therein, is warmed up in the preset mode while continuously being supplied with the warmed gaseous nitrogen in order to freeze-dry the cell sample; under the conditions that dry and clean gaseous nitrogen is used as a thermal medium for sublimation and drying and an inert protective agent, and the liquid nitrogen temperature is used as the sublimation starting temperature, such that the solid state water in the cell sample is sublimated into gaseous water, then the gas discharger discharges the gaseous nitrogen and the gaseous water obtained from sublimation of the solid state water in the cell sample; wherein the freeze-drying operation box has been preset to the temperature suitable for placing the cell sample freeze-dried by liquid nitrogen therein. Since the freeze-drying operation box has been preset to a preferential temperature prior to placing the cell sample therein, the problem of cell damage caused by great difference between temperatures of the cell sample and the freeze-drying operation box when placing the cell sample is solved. Nitrogen is used as a sublimation medium, and sublimation energy is provided through continuous heating, such that sublimation of water in the cell sample and dehydration of the cell sample can be performed under a normal pressure. Further, nitrogen has characteristics of low price in the industry, little pollution to environment and little energy consumption, resulting in beneficial effects of safety, high efficiency and low cost.

Further, the freeze-drying operation box comprises:
- a sample accessing part suitable for placing the cell sample in the freeze-drying operation box or removing the cell sample which has been freeze-dried from the freeze-drying operation box; and
- a warming plate suitable for warming up the freeze-drying operation box in the preset mode.

Further, the temperature-elevated nitrogen supplier comprises:
- a liquid nitrogen storage tank suitable for storing the liquid nitrogen;
- a gas generator suitable for converting the liquid nitrogen to the gaseous nitrogen; and
- a gas warmer suitable for warming up the gaseous nitrogen and supplying the warmed gaseous nitrogen to the freeze-drying operation box;

wherein the liquid nitrogen storage tank, the gas generator and the gas warmer are connected in that order by using a second connecting pipe, and the gas warmer is connected to the freeze-drying operation box through the first connecting pipe.

Further, the freeze-drying operation box further comprises a volume adjuster suitable for adjusting volume of the freeze-drying operation box.

Further, the cell freeze-drying system further comprises:
a flow transducer disposed at an inlet of the freeze-drying operation box through which the warmed gaseous nitrogen is supplied to the freeze-drying operation box, and suitable for obtaining a flow rate of the warmed gaseous nitrogen which is supplied to the freeze-drying operation box; and
a central controller suitable for controlling power of the gas generating device, power of the gas warming device, and warming power of the warming plate to rise in a preset mode, according to the volume of the freeze-drying operation box and the flow rate of the warmed gaseous nitrogen obtained by the flow transducer.

Further, the sample accessing part further obtains a weight of the cell sample placed in the freeze-drying operation box; and
the central controller further controls the volume adjuster to adjust the volume of the freeze-drying operation box according to the weight of the cell sample obtained by the sample accessing part.

Further, the gas discharger further comprises a heater, the heater adjusts a temperature of the gas discharger to control a discharging rate of the gaseous nitrogen.

Accordingly, an embodiment of the present invention also provides a cell freeze-drying method, comprising:
placing a cell sample in a freeze-drying operation box; wherein the cell sample is a cell sample frozen by liquid nitrogen, and the freeze-drying operation box has been preset to a temperature suitable for placing the cell sample frozen by liquid nitrogen;
initiating a freeze-drying process of the freeze-drying operation box, comprising: warming up the freeze-drying operation box in a preset mode, and continuously supplying warmed gaseous nitrogen to the freeze-drying operation box, such that solid state water in the cell sample is sublimated into gaseous water which is contained in the warmed gaseous nitrogen, while the gaseous nitrogen and the gaseous water obtained from sublimation of the solid state water in the cell sample are continuously discharged; and
ending the freeze-drying process of the freeze-drying operation box and removing the cell sample from the freeze-drying operation box, when a preset freeze-drying stop condition is reached.

Compared with the prior art, in the technical solution of the cell freeze-drying method disclosed in the present invention, the cell sample freeze-dried by liquid nitrogen is placed in the freeze-drying operation box, then the freeze-drying process of the freeze-drying operation box is initiated, which comprises: warming up the freeze-drying operation box in the preset mode, and continuously supplying warmed gaseous nitrogen to the freeze-drying operation box, such that solid state water in the cell sample is sublimated into gaseous water while the gaseous nitrogen and the gaseous water obtained from sublimation of the solid state water in the cell sample are continuously discharged; when a preset freeze-drying stop condition is reached, the freeze-drying process of the freeze-drying operation box is ended, and the cell sample is removed from the freeze-drying operation box. Since the freeze-drying operation box has been preset to a preferential temperature prior to placing the cell sample therein, the problem of cell damage caused by great difference between temperatures of the cell sample and the freeze-drying operation box when placing the cell sample is solved. Nitrogen is used as a sublimation medium, and sublimation energy is provided through continuous heating, such that sublimation of water in the cell sample and dehydration of the cell sample can be performed under a normal pressure. Further, nitrogen has characteristics of low price in the industry, little pollution to environment and little energy consumption, resulting in beneficial effects of safety, high efficiency and low cost.

Further, the continuously supplying warmed gaseous nitrogen to the freeze-drying operation box specifically comprises:
converting liquid nitrogen to the gaseous nitrogen to obtain the gaseous nitrogen;
warming up the gaseous nitrogen; and
supplying the warmed gaseous nitrogen to the freeze-drying operation box.

Further, the placing the cell sample in the freeze-drying operation box specifically comprises:
placing the cell sample in the freeze-drying operation box which has been precooled and obtaining a weight of the cell sample, and adjusting volume of the freeze-drying operation box according to the weight of the cell sample; and
the warming the freeze-drying operation box in the preset mode specifically comprises:
obtaining a flow rate of the gaseous nitrogen supplied to the freeze-drying operation box, and controlling the freeze-drying operation box to be warmed up in the preset mode according to the volume of the freeze-drying operation box and the flow rate of the gaseous nitrogen supplied to the freeze-drying operation box.

DETAILED DESCRIPTION OF PREFERRED EMBODIMENTS

The technical solutions in embodiments of the present invention are clearly and completely described in the following with reference to the accompanying drawings in the embodiments of the present invention. It is obvious that the described embodiments are only a part of embodiments of the present invention, but not all embodiments. All other embodiments obtained by those skilled in the art based on the embodiments of the present invention without creative efforts are within the scope of the present invention.

Figure 1:
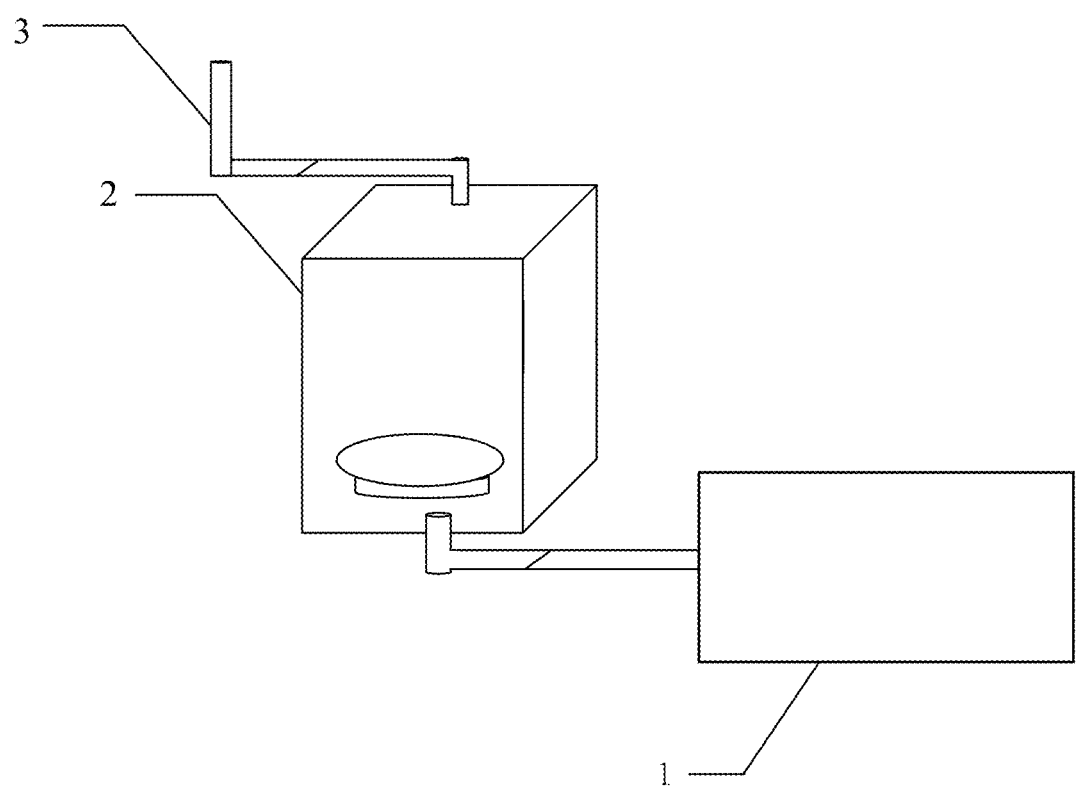
FIG. 1 is a schematic structural view of a cell freeze-drying system according to Embodiment 1 of the present invention.

Refer to FIG. 1, which is a schematic structural view of a cell freeze-drying system according to Embodiment 1 of the present invention, and the cell freeze-drying system according to Embodiment 1 of the present invention comprises:
a temperature-elevated nitrogen supplier 1, a freeze-drying operation box 2, and a gas discharger 3; wherein the temperature-elevated nitrogen supplier 1, the freeze-drying operation box 2, and the gas discharger 3 are successively connected by using a first connecting pipe, in particular:

the temperature-elevated nitrogen supplier 1 supplies warmed gaseous nitrogen to the freeze-drying operation box 2;

the freeze-drying operation box 2 is warmed up in a preset mode while continuously being supplied with the warmed gaseous nitrogen after a cell sample is placed in the freeze-drying operation box 2 in order to freeze-dry the cell sample, such that solid state water in the cell sample is sublimated into gaseous water; wherein the cell sample is a cell sample frozen by liquid nitrogen; the freeze-drying operation box 2 has been preset to a temperature suitable for placing the cell sample frozen by liquid nitrogen.

Generally, the freeze-drying starting temperature of the existing equipment is higher than −90° C., and liquid nitrogen is commonly used as a working medium for freezing cell. However, there is a huge difference between the freeze-drying starting temperature and the temperature of liquid nitrogen, which easily results in cell damage caused by freeze-drying. The preferential temperature for placing the cell sample frozen by liquid nitrogen in the present invention refers to a temperature which does not cause structural damage to the cell sample frozen by liquid nitrogen, and an ideal preferential temperature is preferably −186° C. The actual temperature of the freeze-drying operation box 2 is often slightly higher than −186° C., but since the cell sample is protected by liquid nitrogen when entering the freeze-drying operation box 2, and the freeze-drying process has been initiated before the temperature of the cell sample is raised from the liquid nitrogen temperature to the temperature of the box, that is, the cell sample is still protected by liquid nitrogen at the beginning of freeze-drying, it can be considered that the cell sample is freeze-dried from the liquid nitrogen temperature, and the liquid nitrogen temperature is the sublimation starting temperature.

The gas discharger 3 is suitable for discharging gaseous nitrogen and the gaseous water obtained from sublimation of the solid state water in the cell sample.

The freeze-drying system according to the embodiment of the present invention completes the freeze-drying process of the cell sample based on a principle that dry and clean gaseous nitrogen is used as a thermal medium for sublimation and drying and an inert protective agent, and the liquid nitrogen temperature is used as the sublimation starting temperature, such that sublimation of water in the cell sample and dehydration of the cell sample are performed under a normal pressure. In particular, nitrogen is introduced into the freeze-drying operation box, and when the nitrogen is pure, it can be considered that no water is contained in the nitrogen environment of the freeze-drying operation box, or an equilibrium state of the sublimated water partial pressure is considered to be reached in the freeze-drying operation box at this time. Upon the temperature rises, the equilibrium state of nitrogen is broken, thereby initiating the sublimation of the solid state water in the cell sample. Continuous warming can achieve continuous sublimation until cells are completely dehydrated.

Both the first and the second connecting pipes used in the embodiment are adiabatic connecting pipes. The first and the second connecting pipes are respectively provided with a one-way airtight valve to ensure unidirectionality of gas circulation, thereby ensuring normal operation of the freeze-drying process.

In a specific implementation, the freeze-drying operation box 2 is firstly initiated to start precooling, and the temperature-elevated nitrogen supplier 1 and the gas discharger 3 are initiated, such that the temperature of the freeze-drying operation box 2 reaches a temperature suitable for placing the cell sample frozen by liquid nitrogen, e.g. −186° C. Then the cell sample is placed in the freeze-drying operation box 2, and the freeze-drying operation box 2 is warmed up in the preset mode after being placed the cell sample therein while continuously being supplied with the warmed gaseous nitrogen in order to freeze-dry the cell sample, such that solid state water in the cell sample is sublimated into gaseous water which is contained in the gaseous nitrogen. Upon a preset freeze-drying stop condition is reached, the cell sample is removed from the freeze-drying operation box 2, and the freeze-drying process of the cell sample is ended.

Compared with the prior art, the embodiment of the present invention solves the problem of cell structure damage existing in existing freeze-drying technologies. Using nitrogen as a sublimation medium results in little energy consumption. Besides, nitrogen has characteristics of low price in the industry, and little pollution to environment, resulting in beneficial effects of safety, high efficiency and low cost.

Figure 2:
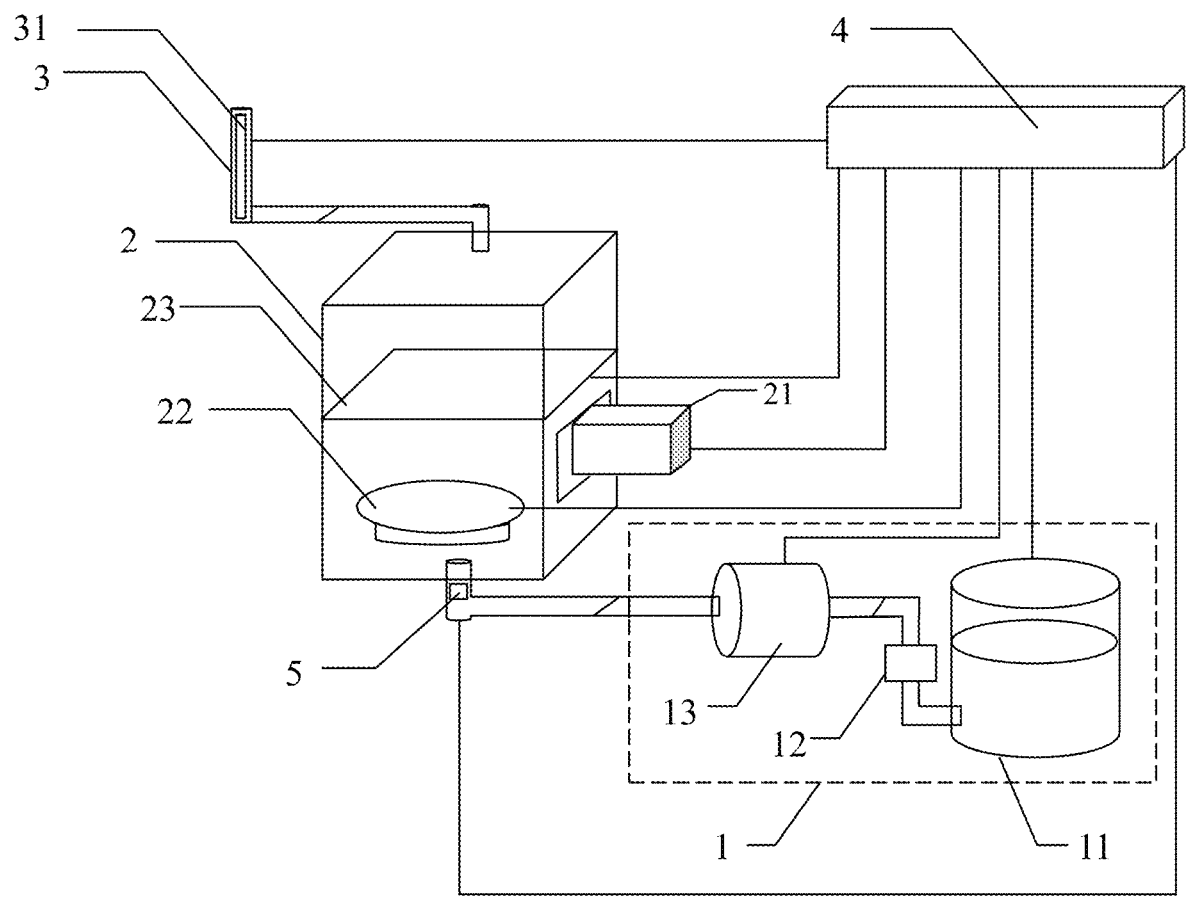
FIG. 2 is a schematic structural view of a cell freeze-drying system according to Embodiment 2 of the present invention.

Refer to FIG. 2, which is a schematic structural view of a cell freeze-drying system according to Embodiment 2 of the present invention, and the cell freeze-drying system according to Embodiment 2 of the present invention comprises:

a temperature-elevated nitrogen supplier 1, a freeze-drying operation box 2, and a gas discharger 3; wherein the temperature-elevated nitrogen supplier 1, the freeze-drying operation box 2, and the gas discharger 3 are successively connected by using a first connecting pipe, in particular:

the temperature-elevated nitrogen supplier 1 supplies warmed gaseous nitrogen to the freeze-drying operation box 2;

the freeze-drying operation box 2 is warmed up in a preset mode while continuously being supplied with the warmed gaseous nitrogen after a cell sample is placed in the freeze-drying operation box 2 in order to freeze-dry the cell sample, such that solid state water in the cell sample is sublimated into gaseous water; wherein the cell sample is a cell sample frozen by liquid nitrogen; the freeze-drying operation box 2 has been preset to a temperature suitable for placing the cell sample frozen by liquid nitrogen.

Generally, the freeze-drying starting temperature of the existing equipment is higher than −90° C., and liquid nitrogen is commonly used as a working medium for freezing cell, however, there is a huge difference between the freeze-drying starting temperature and the temperature of liquid nitrogen, which easily results in cell damage caused by freeze-drying. The preferential temperature for placing the cell sample frozen by liquid nitrogen in the present invention refers to a temperature which does not cause structural damage to the cell sample frozen by liquid nitrogen and an ideal preferential temperature is preferably −186° C. The actual temperature of the freeze-drying operation box 2 is often slightly higher than −186° C., but since the cell sample is protected by liquid nitrogen when entering the freeze-drying operation box 2, and the freeze-drying process has been initiated before the temperature of the cell sample is raised from the liquid nitrogen temperature to the temperature of the box, that is, the cell sample is still protected by liquid nitrogen at the beginning of freeze-drying, it can be considered that the cell sample is freeze-dried from the liquid nitrogen temperature, and the liquid nitrogen temperature is the sublimation starting temperature.

The gas discharger 3 is suitable for discharging gaseous nitrogen and the gaseous water obtained from sublimation of the solid state water in the cell sample.

The freeze-drying system according to the embodiment of the present invention completes the freeze-drying process of the cell sample based on a principle that dry and clean gaseous nitrogen is used as a thermal medium for sublimation and drying and an inert protective agent, and the liquid nitrogen temperature is used as the sublimation starting temperature, such that sublimation of water in the cell sample and dehydration of the cell sample are performed under a normal pressure. In particular, nitrogen is introduced into the freeze-drying operation box, and when the nitrogen is pure, it can be considered that no water is contained in the nitrogen environment of the freeze-drying operation box, or an equilibrium state of the sublimated water partial pressure is considered to be reached in the freeze-drying operation box at this time. Upon the temperature rises, the equilibrium state of nitrogen is broken, thereby starting the sublimation of the solid state water in the cell sample. Continuous warming can achieve continuous sublimation until cells are completely dehydrated.

Preferably, the freeze-drying operation box 2 comprises:
a sample accessing part 21 suitable for placing the cell sample in the freeze-drying operation box 2 or removing the cell sample which has been freeze-dried from the freeze-drying operation box 2; and
a warming plate 22 suitable for warming up the freeze-drying operation box 2 in the preset mode. In addition, as shown in FIG. 1, the warming plate 22 can also be used as a supporter to support the cell sample which is placed in the freeze-drying operation box 2. The cell sample is placed in the freeze-drying operation box 2 through the sample accessing part, and transferred to the warming plate 22. The warming plate 22 according to this embodiment is preferably a metal warming plate. Since a metal material has a larger heat capacity than nitrogen, the warming plate 22 made of a metal material can be used as a temperature-controllable buffer in the freeze-drying operation box 2, such that the amount of nitrogen used can be reduced and it is easy to control the temperature inside the freeze-drying operation box 2.

Further, the freeze-drying operation box 2 also comprises a volume adjuster 23 suitable for adjusting volume of the freeze-drying operation box 2.

Preferably, the temperature-elevated nitrogen supplier 1 comprises:
a liquid nitrogen storage tank 11 suitable for storing the liquid nitrogen; a liquid nitrogen storage tank 11 equipped with a liquid nitrogen level position sensor is preferable, and is used to obtain the liquid nitrogen reserve in the liquid nitrogen storage tank 11 or the amount of liquid nitrogen used;
a gas generator 12 suitable for converting the liquid nitrogen to the gaseous nitrogen; and
a gas warmer 13 suitable for warming up the gaseous nitrogen and supplying the warmed gaseous nitrogen to the freeze-drying operation box;
wherein the liquid nitrogen storage tank 11, the gas generator 12 and the gas warmer 13 are successively connected by using a second connecting pipe, and the gas warmer 13 is connected to the freeze-drying operation box 2 through the first connecting pipe.

In order to achieve automation and intelligentization, the embodiment further comprises a central controller 4 and a flow transducer 5. The flow transducer 5 is disposed at an inlet of the freeze-drying operation box 2 through which the warmed gaseous nitrogen is supplied to the freeze-drying operation box 2, and suitable for obtaining a flow rate of the warmed gaseous nitrogen which is supplied to the freeze-drying operation box. The central controller 4 is suitable for controlling power of the gas generator 12, power of the gas warmer 13, and warming power of the warming plate 22 to rise in a preset mode, according to the volume of the freeze-drying operation box 2 and the flow rate of the warmed gaseous nitrogen obtained by the flow transducer 5.

Further, the sample accessing part 21 obtains a weight of the cell sample placed in the freeze-drying operation box 2; and the central controller 4 controls the volume adjuster 23 to adjust the volume of the freeze-drying operation box 2 according to the weight of the cell sample obtained by the sample accessing part 21.

Further, the gas discharger 3 comprises a heater 31, the heater 31 adjusts a temperature of the gas discharger 3 to control a rate of the gaseous nitrogen discharged by the gas discharger 3. Preferably, the heater 31 can be controlled by the central controller 4.

Both the first and the second connecting pipes used in the embodiment are adiabatic connecting pipes. The first and the second connecting pipes are respectively provided with a one-way airtight valve to ensure unidirectionality of gas circulation, thereby ensuring normal operation of the freeze-drying process.

Further, it is preferable to provide a first temperature sensor 61 in the gas warmer 13, a second temperature sensor 62 at the inlet of the freeze-drying operation box 2 through which the gaseous nitrogen is supplied, a third temperature sensor 63 in the warming plate 22, and a fourth temperature sensor 64 in the heater 31, such that the central controller 4 obtains the temperature values of the gas warmer 13, the inlet of the freeze-drying operation box 2 through which the gaseous nitrogen passes, the warming plate 22 and the heater 31, respectively.

In a specific implementation, the central controller 4 is firstly initiated to obtain the temperature values of the gas warmer 13, the inlet of the freeze-drying operation box 2 through which the gaseous nitrogen is supplied, the warming plate 22 and the heater 31, respectively. The freeze-drying operation box 2 is secondly initiated to start precooling, and the temperature-elevated nitrogen supplier 1 and the gas discharger 3 are initiated. At this time, the gas generator of the temperature-elevated nitrogen supplier 1 is activated, such that the temperature of the freeze-drying operation box 2 reaches a temperature suitable for placing the cell sample frozen by liquid nitrogen, e.g. −186° C. Then the cell sample is placed by the sample accessing part 21 to obtain the weight of the cell sample, following transferred to the warming plate 22. Next, the central controller 4 controls the volume adjuster 23 to adjust the volume of the freeze-drying operation box 2 according to the weight of the cell sample. At the same time, the central controller 4 controls power of the gas generator 12, power of the gas warmer 13, and warming power of the warming plate 22 to rise in a preset mode, according to the adjusted volume of the freeze-drying operation box 2 and the reading of the flow transducer 5, such that the freeze-drying operation box is warmed up in the preset mode while continuously being supplied with the warmed gaseous nitrogen in order to activate the freeze-dry process of the cell sample. Upon a preset freeze-drying stop condition is reached, the cell sample is removed by the sample accessing part 21 from the freeze-drying operation box 2, and the freeze-drying process of the cell sample is ended.

The implementations described in this embodiment, comprising how the central controller 4 adjusts the temperature and the volume of the freeze-drying operation box 2, how the temperature-elevated nitrogen supplier 1 obtains the warmed gaseous nitrogen, and the gas discharger 3 discharges, are preferred implementations, however, those skilled in the art should understand that improved implementations which can replace the above implementations and achieve the technical effects of the present invention are also within the protection scope of the present invention without departing from the principle of the present invention.

Compared with the prior art, the embodiment of the present invention solves the problem of cell damage caused by huge starting temperature difference when placing. Furthermore, nitrogen is used as a sublimation medium, and sublimation energy is provided through continuous warming, such that the sublimation of water in the cell sample can be performed under a normal pressure. Besides, nitrogen has characteristics of low price in the industry, little pollution to environment and little energy consumption, resulting in beneficial effects of safety, high efficiency and low cost. Further, the freeze-drying system of the embodiment is a completely controllable freeze-drying environment, work efficiency would be ensured only through setting a suitable program.

Figure 3:
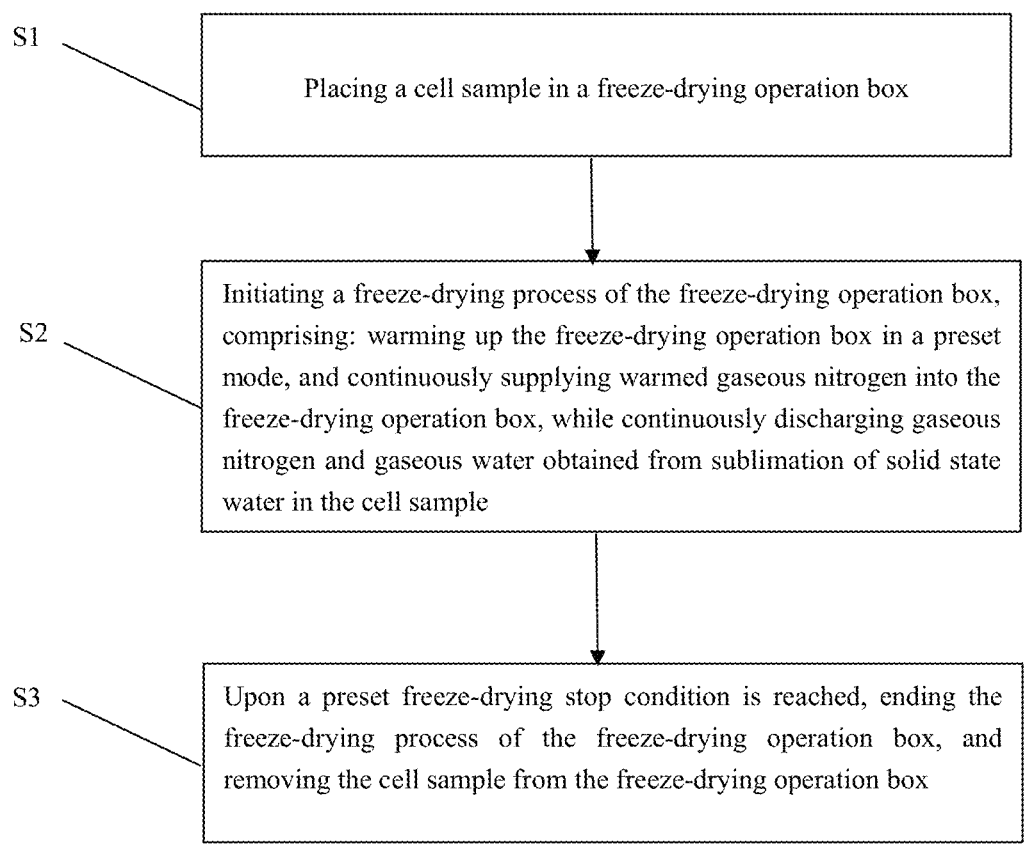
FIG. 3 is a schematic flowchart of a cell freeze-drying method according to Embodiment 3 of the present invention.

Correspondingly, as shown in FIG. 3, which is a schematic flowchart of a cell freeze-drying method according to Embodiment 3 of the present invention, the method specifically comprises:

step S1: placing a cell sample in a freeze-drying operation box; wherein the cell sample is a cell sample frozen by liquid nitrogen, and the freeze-drying operation box has been preset to a temperature suitable for placing the cell sample frozen by liquid nitrogen;

step S2: initiating a freeze-drying process of the freeze-drying operation box, comprising: warming up the freeze-drying operation box in a preset mode, and continuously supplying warmed gaseous nitrogen to the freeze-drying operation box, such that solid state water in the cell sample is sublimated into gaseous water, while the gaseous nitrogen and the gaseous water from sublimation of the solid state water in the cell sample are continuously discharged; and step S3: ending the freeze-drying process of the freeze-drying operation box and removing the cell sample from the freeze-drying operation box, when a preset freeze-drying stop condition is reached.

The freeze-drying system according to the embodiment of the present invention completes the freeze-drying process of the cell sample based on a principle that dry and clean gaseous nitrogen is used as a thermal medium for sublimation and drying and an inert protective agent, and the liquid nitrogen temperature is used as the sublimation starting temperature, such that sublimation of water in the cell sample and dehydration of the cell sample are performed under a normal pressure. In particular, nitrogen is introduced into the freeze-drying operation box, and when the nitrogen is pure, it can be considered that no water is contained in the nitrogen environment of the freeze-drying operation box, or an equilibrium state of the sublimated water partial pressure is considered to be reached in the freeze-drying operation box at this time. Upon the temperature rises, the equilibrium state of nitrogen is broken, thereby initiating the sublimation of the solid state water in the cell sample. Continuous warming can achieve continuous sublimation until cells are completely dehydrated.

Generally, the freeze-drying starting temperature of the existing equipment is higher than −90° C., and liquid nitrogen is commonly used as a working medium for freezing cell, however, there is a huge difference between the freeze-drying starting temperature and the temperature of liquid nitrogen, which easily results in cell damage caused by freeze-drying. The preferential temperature for placing the cell sample frozen by liquid nitrogen in the present invention refers to a temperature which does not cause structural damage to the cell sample frozen by liquid nitrogen and an ideal preferential temperature is preferably −186° C. The actual temperature of the freeze-drying operation box 2 is often slightly higher than −186° C., but since the cell sample is protected by liquid nitrogen when entering the freeze-drying operation box 2, and the freeze-drying process has been initiated before the temperature of the cell sample is raised from the liquid nitrogen temperature to the temperature of the box, that is, the cell sample is still protected by liquid nitrogen at the beginning of freeze-drying, it can be considered that the cell sample is freeze-dried from the liquid nitrogen temperature, and the liquid nitrogen temperature is the starting temperature for sublimation.

The nitrogen obtained by direct gasification of liquid nitrogen has a high purity. The continuously supplying the warmed gaseous nitrogen to the freeze-drying operation box in step S2 preferably comprises: firstly converting liquid nitrogen to the gaseous nitrogen to obtain the gaseous nitrogen; then warming up the gaseous nitrogen; and finally, supplying the warmed gaseous nitrogen to the freeze-drying operation box. Here, as a preferred implementation, since obtaining of gaseous nitrogen and heating of the gaseous nitrogen can be performed by a method in the prior art, other methods to obtain warmed nitrogen based on the principle of the present invention are also within the protection scope of the present invention.

In addition, in order to ensure that the freeze-drying operation box is warmed up according to the preset mode upon the freeze-drying process is initiated, it is preferred that the gaseous nitrogen supplied is also warmed up according to the preset mode, such that the temperature of the gaseous nitrogen supplied to the freeze-drying operation box can be substantially consistent with that of the freeze-drying operation box, continuously providing energy for the sublimation of solid state water in the cell sample.

The discharging the gaseous nitrogen and the gaseous water from sublimation of the solid state water in the cell sample in step S2 of the freeze-drying method is performed preferably by heating, which compels the gaseous nitrogen and the gaseous water obtained from sublimation of the solid state water in the cell sample to exhaust, improving discharge efficiency.

The placing the cell sample in the freeze-drying operation box in step S3 specifically comprises:

placing the cell sample in the freeze-drying operation box which has been precooled and obtaining a weight of the cell sample, and adjusting volume of the freeze-drying operation box according to the weight of the cell sample.

Correspondingly, the warming the freeze-drying operation box in the preset mode in step S2 specifically comprises:

obtaining a flow rate of the gaseous nitrogen supplied to the freeze-drying operation box, and controlling the freeze-drying operation box to be warmed up in the preset mode according to the volume of the freeze-drying operation box and the flow rate of the gaseous nitrogen supplied to the freeze-drying operation box.

In a specific implementation, the cell sample frozen by liquid nitrogen is firstly placed in the freeze-drying operation box which is preset to a temperature suitable for placing the cell sample frozen by liquid nitrogen; then the freeze-drying process of the freeze-drying operation box is initiated, which comprises warming up the freeze-drying operation box in the preset mode, and continuously supplying the warmed gaseous nitrogen to the freeze-drying operation box, such that the solid state water contained in the cell sample is sublimated into gaseous water while the gaseous nitrogen and the gaseous water obtained from sublimation of the solid state water in the cell sample are continuously discharged; and upon a preset freeze-drying stop condition is reached, ending the freeze-drying process of the freeze-drying operation box, and removing the cell sample from the freeze-drying operation box.

Compared with the prior art, the embodiment of the present invention solves the problem of cell structure damage existing in the prior freeze-drying technologies. Using nitrogen as a sublimation medium results in little energy consumption. Besides, nitrogen has characteristics of low price in the industry, and little pollution to environment, resulting in beneficial effects of safety, high efficiency and low cost.

The above embodiments are preferred embodiment of the present invention, and it should be noted that those skilled in the art can also make improvements and modifications which also fall in the protection scope of the present invention without departing from the principles of the present invention.

What is claimed is:

1. A cell freeze-drying system, comprising: a temperature-elevated nitrogen supplier, a freeze-drying operation box, and a gas discharger; the temperature-elevated nitrogen supplier, the freeze-drying operation box, and the gas discharger are connected in that order by using a first connecting pipe, wherein the temperature-elevated nitrogen supplier supplies warmed gaseous nitrogen to the freeze-drying operation box; the freeze-drying operation box is warmed up in a preset mode while continuously being supplied with the warmed gaseous nitrogen after a cell sample is placed in the freeze-drying operation box in order to freeze-dry the cell sample, such that solid state water in the cell sample is sublimated into gaseous water; wherein the cell sample is a cell sample frozen by liquid nitrogen; the freeze-drying operation box has been preset to −186° C.; and the gas discharger discharges gaseous nitrogen and the gaseous water obtained from sublimation of the solid state water in the cell sample.

2. The cell freeze-drying system according to claim 1, wherein the freeze-drying operation box comprises:
   a sample accessing part for placing the cell sample in the freeze-drying operation box or removing the cell sample which has been freeze-dried from the freeze-drying operation box; and
   a warming plate for warming up the freeze-drying operation box in the preset mode.

3. The cell freeze-drying system according to claim 1, wherein the temperature-elevated nitrogen supplier comprises:
   a liquid nitrogen storage tank for storing the liquid nitrogen;
   a gas generator for converting the liquid nitrogen to gaseous nitrogen; and
   a gas warmer for warming up the gaseous nitrogen generated by the gas generator and supplying the warmed gaseous nitrogen to the freeze-drying operation box;
   wherein the liquid nitrogen storage tank, the gas generator and the gas warmer are connected in that order by using a second connecting pipe, and the gas warmer is connected to the freeze-drying operation box through the first connecting pipe.

4. The cell freeze-drying system according to claim 2, wherein the freeze-drying operation box further comprises a volume adjuster for adjusting volume of the freeze-drying operation box.

5. The cell freeze-drying system according to claim 4, wherein the cell freeze-drying system further comprises:
   a flow transducer disposed at an inlet of the freeze-drying operation box through which the warmed gaseous nitrogen is supplied to the freeze-drying operation box; the flow transducer is for obtaining a flow rate of the warmed gaseous nitrogen which is supplied to the freeze-drying operation box; and
   a central controller for controlling power of the gas generator, power of the gas warmer, and warming power of the warming plate to rise in a preset mode, according to the volume of the freeze-drying operation box and the flow rate of the warmed gaseous nitrogen obtained by the flow transducer.

6. The cell freeze-drying system according to claim 5, wherein the sample accessing part further obtains a weight of the cell sample placed in the freeze-drying operation box; and
   the central controller further controls the volume adjuster to adjust the volume of the freeze-drying operation box according to the weight of the cell sample obtained by the sample accessing part.

7. The cell freeze-drying system according to claim 5, wherein the gas discharger further comprises a heater, the heater adjusts a temperature of the gas discharger to control a discharging rate of the gaseous nitrogen.

8. A cell freeze-drying method, comprising:
   placing a cell sample in a freeze-drying operation box; wherein the cell sample is a cell sample frozen by liquid nitrogen, and the freeze-drying operation box has been preset to −186° C.;
   initiating a freeze-drying process of the freeze-drying operation box, comprising: warming up the freeze-drying operation box in a preset mode, and continuously supplying warmed gaseous nitrogen to the freeze-drying operation box, such that solid state water in the cell sample is sublimated into gaseous water which is contained in the warmed gaseous nitrogen, while the gaseous nitrogen and the gaseous water obtained from sublimation of the solid state water in the cell sample are continuously discharged; and
   ending the freeze-drying process of the freeze-drying operation box and removing the cell sample from the freeze-drying operation box, when a preset freeze-drying stop condition is reached.

9. The cell freeze-drying method according to claim 8, wherein the continuously supplying warmed gaseous nitrogen to the freeze-drying operation box specifically comprises:
   converting liquid nitrogen to the gaseous nitrogen to obtain the gaseous nitrogen;
   warming up the gaseous nitrogen; and
   supplying the warmed gaseous nitrogen to the freeze-drying operation box.

10. The cell freeze-drying method according to claim 9, wherein the placing the cell sample in the freeze-drying operation box specifically comprises:

placing the cell sample in the freeze-drying operation box which has been precooled and obtaining a weight of the cell sample, and adjusting volume of the freeze-drying operation box according to the weight of the cell sample; and the warming the freeze-drying operation box in the preset mode specifically comprises:

obtaining a flow rate of the gaseous nitrogen supplied to the freeze-drying operation box, and controlling the freeze-drying operation box to be warmed up in the preset mode according to the volume of the freeze-drying operation box and the flow rate of the gaseous nitrogen supplied to the freeze-drying operation box.

\* \* \* \* \*